(12) United States Patent
Fischbein et al.

(10) Patent No.: US 10,280,675 B2
(45) Date of Patent: May 7, 2019

(54) METHOD FOR LOWERING A WINDOW PANE OF A VEHICLE DOOR, AND VEHICLE WHICH IS DESIGNED FOR CARRYING OUT THE METHOD

(71) Applicant: Ford Global Technologies, LLC, Dearborn, MI (US)

(72) Inventors: Igor Fischbein, Cologne (DE); Robin Oliver Dargel, Cologne (DE); Torsten Gerhardt, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 236 days.

(21) Appl. No.: 15/486,614

(22) Filed: Apr. 13, 2017

(65) Prior Publication Data

US 2017/0314317 A1 Nov. 2, 2017

(30) Foreign Application Priority Data

Apr. 29, 2016 (DE) .................. 10 2016 207 362

(51) Int. Cl.
*E05F 15/20* (2006.01)
*E05F 15/73* (2015.01)
(Continued)

(52) U.S. Cl.
CPC .............. *E05F 15/73* (2015.01); *B60J 1/17* (2013.01); *B60J 5/0401* (2013.01); *B60J 5/0493* (2013.01);
(Continued)

(58) Field of Classification Search
CPC ......... E05F 15/71; E05F 15/73; E05F 15/689; E05F 15/70; B60J 5/00; B60J 7/0573; B60J 1/17; E05B 81/00; E05B 81/01; E05C 19/02; E05Y 2400/358; E05Y 2400/354; E05Y 2900/55
USPC .................. 49/349, 506, 502, 31; 701/36
See application file for complete search history.

(56) References Cited

U.S. PATENT DOCUMENTS

| 4,571,884 A * | 2/1986 | Hetmann | B60J 1/17 |
| | | | 296/117 |
| 5,810,423 A * | 9/1998 | Brackmann | B60J 1/17 |
| | | | 296/146.2 |

(Continued)

FOREIGN PATENT DOCUMENTS

| DE | 19632139 C1 | 7/1997 |
| GB | 2299870 A | 10/1996 |

*Primary Examiner* — Chi Q Nguyen
(74) *Attorney, Agent, or Firm* — Vichit Chea; Price Heneveld LLP

(57) ABSTRACT

A vehicle and method for lowering a window pane of a door of a vehicle to make it easier for the vehicle occupant to enter and exit the vehicle. The door has a door unlocking apparatus and a drive device for lowering and raising the window pane. The vehicle has an unlocking sensor, which registers the operation or the imminent operation of the door unlocking apparatus and converts the operation or imminent operation into corresponding unlocking signals, and a control unit, which receives the unlocking signals and converts the signals into operating signals for triggering the drive device. The method checks whether the door unlocking apparatus is operated or operation is imminent and, if the door unlocking apparatus is operated or operation is imminent, triggers the drive device with the control unit to lower the window pane to a position which is easier for the vehicle occupant to enter and exit the vehicle.

14 Claims, 3 Drawing Sheets

(51) Int. Cl.
  *E05F 15/71*   (2015.01)
  *E05F 15/74*   (2015.01)
  *B60J 1/17*    (2006.01)
  *B60J 5/04*    (2006.01)
  *E05F 15/695*  (2015.01)

(52) U.S. Cl.
  CPC ............ *E05F 15/695* (2015.01); *E05F 15/71* (2015.01); *E05F 15/74* (2015.01)

(56) References Cited

U.S. PATENT DOCUMENTS

| | | | | |
|---|---|---|---|---|
| 8,291,645 B2* | 10/2012 | Hohn | ..................... | B60J 7/0573 |
| | | | | 49/348 |
| 8,827,027 B2* | 9/2014 | Syvret | .................... | E05F 15/70 |
| | | | | 180/271 |
| 8,909,430 B2* | 12/2014 | Choi | ....................... | E05B 77/26 |
| | | | | 701/45 |
| 9,556,661 B2* | 1/2017 | Iacovoni | ................. | E05F 15/60 |
| 2003/0071446 A1* | 4/2003 | Haderer | ................ | B60R 21/013 |
| | | | | 280/735 |
| 2008/0136358 A1* | 6/2008 | Newman | ........... | B60H 1/00735 |
| | | | | 318/286 |
| 2009/0069984 A1* | 3/2009 | Turner | ................... | E05F 15/71 |
| | | | | 701/49 |
| 2012/0136532 A1* | 5/2012 | Konchan | ................ | E05B 81/64 |
| | | | | 701/36 |
| 2013/0055642 A1* | 3/2013 | Patterson | .............. | G03G 15/06 |
| | | | | 49/349 |
| 2014/0230499 A1* | 8/2014 | Tokoro | ................. | E05B 43/005 |
| | | | | 70/267 |
| 2015/0292253 A1* | 10/2015 | Hartmann | ............ | E05F 15/695 |
| | | | | 701/49 |

\* cited by examiner

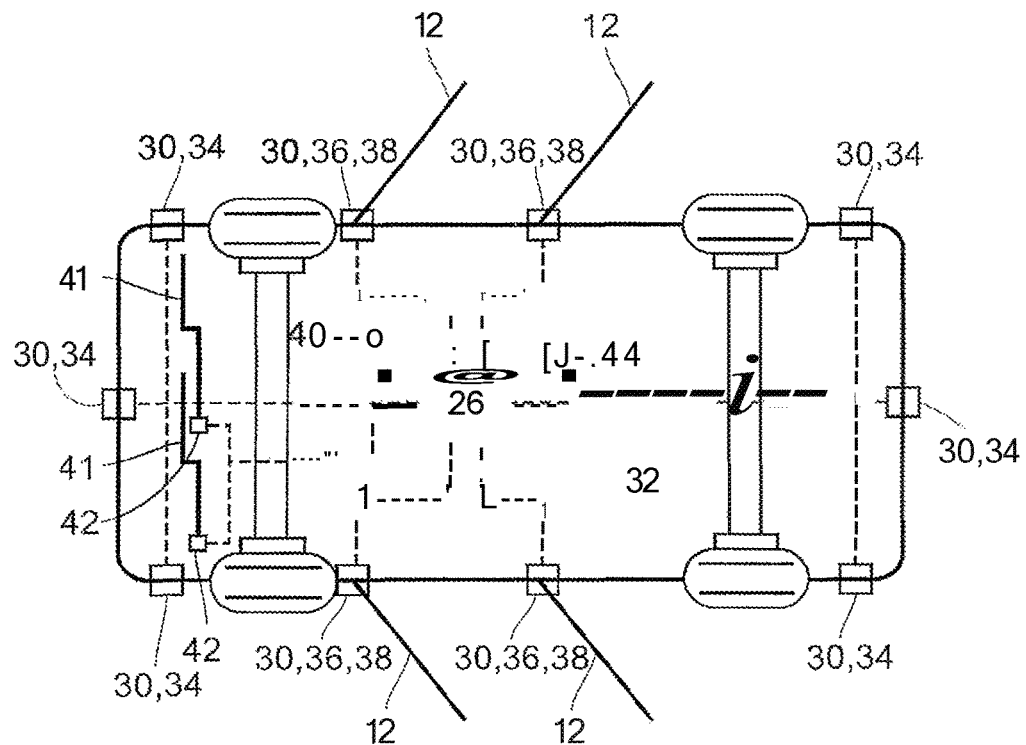
Fig.3
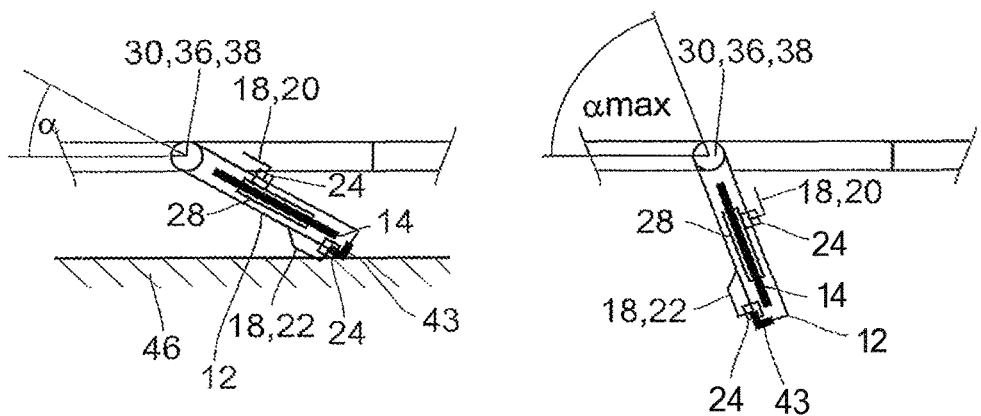
Fig.4A Fig.4B

US 10,280,675 B2

METHOD FOR LOWERING A WINDOW PANE OF A VEHICLE DOOR, AND VEHICLE WHICH IS DESIGNED FOR CARRYING OUT THE METHOD

FIELD OF THE INVENTION

The present invention generally relates to a method for lowering a window pane of a vehicle door of a vehicle in order to make it easier for an occupant to enter and exit the vehicle.

BACKGROUND OF THE INVENTION

In the majority of vehicles, the vehicle doors are fitted to the vehicle body such that they can rotate about the vertical axis or approximately about the vertical axis of the vehicle. When vehicle doors of this kind are opened, the vehicle doors pivot out into the area surrounding the side of the vehicle. In these vehicles, it may be particularly difficult for the vehicle occupant to enter and exit the vehicle, particularly when the vehicle is parked in a location at which objects, such as other vehicles or walls, trees, fences or the like, are located in the area immediately surrounding the side of the vehicle. The vehicle doors, which can rotate about the vertical axis of the vehicle, can in this case only be opened through a small door opening angle, so that the cleared area through which the vehicle occupant can leave the vehicle is very small.

In order to remedy this problem, the vehicle doors can also be fitted such that they cannot rotate about the vertical axis of the vehicle, but rather about the longitudinal axis. Doors of this kind are fitted in the roof of the vehicle and are often also called gull-wing doors. Furthermore, the doors can also be arranged such that they can pivot about the transverse axis or about a rotation axis of the vehicle which is inclined to a certain extent in relation to the transverse axis, as in the case of what are known as scissor doors. In the case of vehicle doors which are fitted in this way, the vehicle door, when open, is not moved or moved only to a slight extent into the area surrounding the side of the vehicle, but rather into an area above the vehicle, where, with the exception of garages with a low ceiling height, a sufficiently large amount of space without obstacles is generally available.

One disadvantage of these gull wing and scissor doors is that the vehicle design differs considerably from the conventional vehicle concepts, and therefore vehicle doors of this kind can be employed for large-scale production only to a limited extent. Consequently, vehicle doors of this kind are found only in a very small number of vehicles, in particular in high-end sports cars which are constructed in relatively small runs.

It would be desirable to make it easier for a vehicle occupant to enter and exit, even if the vehicle door is fitted to the vehicle such that it can rotate about the vertical axis, without further changes to the vehicle design being required for this purpose.

SUMMARY OF THE INVENTION

In general, provision is made in a method for lowering a window pane of a vehicle door of a vehicle of the kind outlined in the introductory part for the window pane to be automatically fully or partially lowered when vehicle sensors identify a situation in which a vehicle occupant is entering or exiting or a process of this kind is imminent and in the case of which entry and exit can be made easier by the lowered window pane position. The lowered position can be determined depending on how close the entry or exit situation is detected to be. Under certain circumstances, for example in the event of precipitation, lowering of the window pane can optionally be entirely or partially suppressed.

When a method according to the invention or additional steps for executing the method according to preferred embodiments are mentioned in the text which follows, it is to be understood that these steps can be combined individually or together in any desired order, provided that this is technically reasonable.

According to one aspect of the invention, a method for lowering a window pane of a vehicle door of a vehicle to make it easier for a vehicle occupant to enter and exit the vehicle is provided. The method includes the steps of providing the vehicle door with a door unlocking apparatus and a drive device for lowering and raising the window pane, registering operation or imminent operation of the door unlocking apparatus with an unlocking sensor and converting the operation or imminent operation into one or more corresponding unlocking signals, and converting the unlocking signals into operating signals for triggering the drive device. The method also includes the step of checking with a control unit, whether the door unlocking apparatus is operated or operation is imminent, and if the door unlocking apparatus is operated or operation is imminent, triggering the drive device via the control unit in such a way that the window pane is lowered to a position in which it is made easier for a vehicle occupant to enter and exit the vehicle.

According to another aspect of the present invention, a method for lowering a window pane of a vehicle door is provided. The method includes the steps of sensing operation or imminent operation of a door unlocking apparatus for unlocking the vehicle door, and activating a drive device to lower the window pane when the door unlocking apparatus is operated or operation is imminent such that the window pane is lowered to a position that is made easier for a vehicle occupant to enter and exit the vehicle.

According to a further aspect of the present invention, a vehicle is provided that includes a door comprising a window pane, a door unlocking apparatus and a drive device. The vehicle also includes an unlocking sensor detecting operation or impending operation of the door unlocking apparatus, and a control unit activating the drive device when operation or imminent operation of the door unlocking apparatus is detected to lower the window pane to a position which is easier for a vehicle occupant to enter and exit the vehicle.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a schematic illustration of a vehicle comprising a number of vehicle doors having window panes that may be lowered when the vehicle door is opened;

FIG. 4a is an isolated top view illustration of a vehicle door which cannot be completely opened;

FIG. 4b is an isolated top view illustration of a vehicle door which can be completely open.

DETAILED DESCRIPTION OF THE PREFERRED EMBODIMENTS

Figure 1:
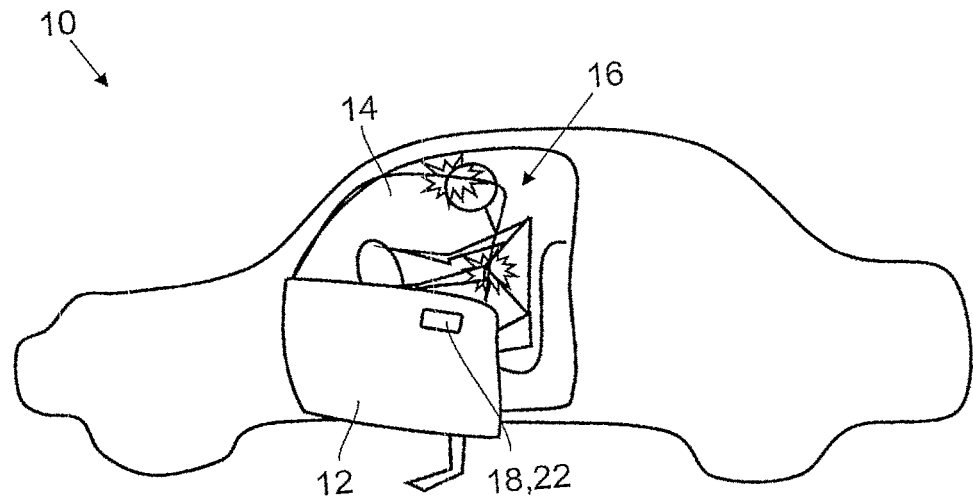
FIG. 1 is a basic side view illustration of a vehicle comprising a vehicle door, the window pane of the vehicle door being operated in a conventional manner when the vehicle door is opened.

FIG. 1 shows, by way of a basic illustration, a vehicle 10 comprising a conventional vehicle door 12 which has a window pane 14. The vehicle door 12 shown and described herein is of a frameless design, however, the following embodiments are not restricted to a frameless vehicle door 12.

If the vehicle door 12 is opened, in the case of vehicles with a conventional vehicle door 12, the window pane 14 may be lowered to such an extent that the window pane 14 no longer engages into the seals, not illustrated, of the stationary part of the vehicle body, in particular into the seals in the roof region of the vehicle. However, the window pane 14 is typically lowered only by a small amount, often only a few millimeters in this case.

FIG. 1 shows the case in which the vehicle door 12 can be opened only through a small door opening angle, for example because objects, not illustrated here, are located in the area immediately surrounding the side of the vehicle. Consequently, when entering and exiting, only a small amount of space is available for a vehicle occupant 16 to enter the vehicle 10 or exit the vehicle 10. In the process, the head, a shoulder and/or an upper arm of the vehicle occupant 16 often come/comes into undesirable contact with the window pane 14. As a result, firstly the vehicle occupant 16 may injure himself and secondly the window pane 14 and/or the vehicle door 12 may be soiled or even damaged. However, the available space for entering and exiting is limited by the window pane 14 in each case.

Figure 2:
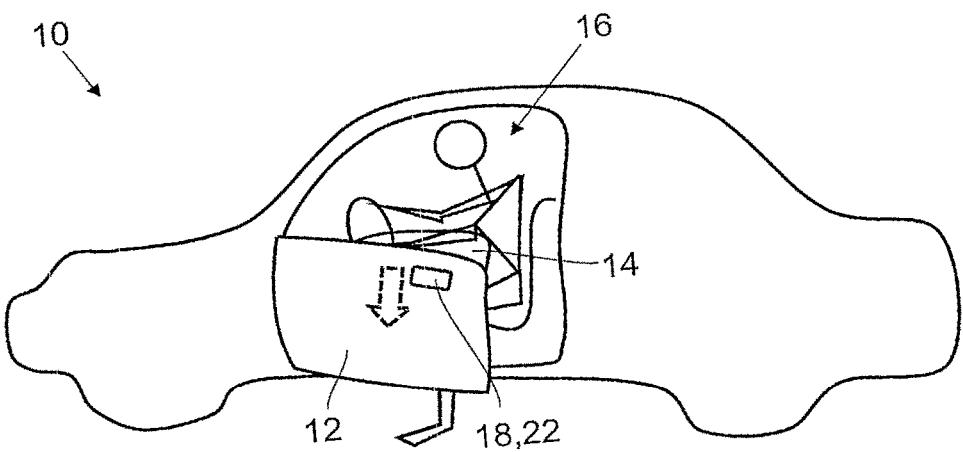
FIG. 2 is a basic side view illustration of a vehicle comprising a vehicle door, the window pane of the vehicle door being lowered to make it easier to enter and exit the vehicle when the vehicle door is opened.

FIG. 2 shows a vehicle 10 in which the window pane 14 of the vehicle door 12 is lowered by employing a method according to one embodiment for making it easier for entry and exit of the vehicle 10. As explained in more detail below, in the case of entry and exit, the window pane 14 is lowered to a position in which it is made easier for the vehicle occupant 16 to enter and exit the vehicle 10. This position can be such that contact between the head, a shoulder and/or an upper arm of the vehicle occupant 16 during movements which the vehicle occupant 16 usually carries out when entering and exiting can be avoided. Furthermore, the vehicle occupant 16 can move, in particular, his head and his shoulder out above the vehicle door 12, as a result of which the weight of the body of the vehicle occupant 16 can be shifted in a manner which is advantageous, in particular, for exiting. It should be noted here that it is not necessary to completely lower the window pane 14, as can be seen in FIG. 2.

FIG. 3 shows a vehicle 10 which is equipped such that it can be operated using the method according to one embodiment. In the illustrated example, the vehicle 10 has a total of four vehicle doors 12 which can have a frame, not illustrated, or can be of a frameless design. One of the left-hand-side vehicle doors 12 is illustrated on an enlarged scale in FIGS. 4a and 4b, and therefore the following statements relate both to FIG. 3 and also to FIGS. 4a and 4b. The vehicle door 12 has a door unlocking apparatus 18 which, in the illustrated exemplary embodiment, comprises an inner unlocking lever 20 and an outer unlocking lever 22. Furthermore, the vehicle door 12 has a number of unlocking sensors 24 which are able to register the operation or the imminent operation of the door unlocking apparatus 18, in this example the operation of the inner or the outer unlocking lever 20, 22. The unlocking sensor 24 generates unlocking signals $S_E$ which are transmitted to a control unit 26 via electrical lines, not illustrated in more detail.

The vehicle door 12 further has a drive device 28, e.g., motor, with which the window pane 14 can be lowered and raised. The drive device 28 can be actuated via electrical lines 32, likewise not illustrated, of the control unit 26, and therefore the window pane 14 can be moved to a position in which it is made easier for the vehicle occupant 16 to enter and exit.

The vehicle 10 further has door parameter determining device 30 with which parameters which relate to the vehicle door 12 can be determined. The unlocking sensors 24 already mentioned above can also be included as door parameter determining device 30. The door parameter determining device 30 generates one or more door parameter signals $S_T$ which are transmitted to the control unit 26. Electrical lines 32 can be provided for this purpose, wherein wireless transmission is also feasible.

In the illustrated example, the door parameter determining device 30 is designed as follows: the door parameter determining device 30 comprises one or more distance sensors 34 with which it is possible to determine whether objects are located in the area surrounding the vehicle and, if yes, where and at what distance. The distance sensors 34 generate corresponding distance signals $S_{AB}$ which are transmitted to the control unit 26.

The door parameter determining device 30 further comprise a number (one or more) of door opening speed sensors 36 with which it is possible to determine the speed at which the vehicle door 12 in question is opened. The door opening speed sensors 36 generate door opening speed signals $S_{VT}$ which can be processed by the control unit 26. Furthermore, the door parameter determining device 30 comprise a number of door opening angle sensors 38 with which it is possible to ascertain the door opening angle α at which the vehicle door 12 is opened. The door opening angle sensors 38 generate door opening angle signals $S_{WT}$ which are transmitted to the control unit 26. For reasons of illustration, the door opening speed sensors 36 and the door opening angle sensors 38 are not individually shown in FIGS. 3, 4a, and 4b.

Furthermore, the vehicle 10 comprises a number of rain sensors 40 with which it is possible to determine whether precipitation, such as rain or snow, is falling or not. In one embodiment, the rain sensors 40 are able to ascertain the intensity of the precipitation and generate corresponding rain intensity signals $S_R$ which, in turn, are transmitted to the control unit 26. The vehicle 10 further has a number of windshield wipers 41, it being possible for the activity of the windshield wipers to be detected by means of windshield wiper activity sensor 42, wherein the windshield wiper activity sensor 42 converts the activity of the windshield wipers 41 into corresponding windscreen wiper activity signals $S_{SW}$ and transmit said signals to the control unit 26.

In addition, the vehicle door 12 is equipped with a door edge protection device 43 which, when the vehicle door is opened, surrounds the door edge by way of an elastic door edge protection element and therefore protects the door edge against contact with objects which are located in the area surrounding the side of the vehicle 10. In the event of contact with these objects, the door edge protection device 43 generates door edge protection signals $S_{TK}$ which are transmitted to the control unit 26.

Furthermore, the vehicle 10 has an activation device 44 with which the control unit 26 can be activated and deactivated based on the evaluation of the above-mentioned signals.

The vehicle 10 may be operated in the following manner: it is assumed that the vehicle 10 is parked at a location in which an object 46 is located in the area surrounding the side of the vehicle, for example a wall or another vehicle 10, as is illustrated in FIG. 4a). If a vehicle occupant 16 wishes to enter the vehicle 10, he operates the vehicle key, as a result of which the vehicle locks are unlocked. Owing to the vehicle locks being unlocked, the unlocking sensor 24 registers that operation of the door unlocking apparatus 18 may be imminent and transmits this information to the control unit 26. However, it is not yet possible to make any statement about which of the vehicle doors is actually intended to be opened on the basis of the operation of the vehicle key. However, the drive device 28 with which the window pane can be lowered and raised can already be moved to the active state by the control unit 26, so that it can be activated immediately and without any lead time. The vehicle occupant 16 then approaches one of the vehicle doors and operates the outer unlocking lever 22. This operation is registered by the unlocking sensor 24 and converted into corresponding unlocking signals $S_E$ which are transmitted to the control unit 26.

However, the unlocking signals $S_E$ alone do not provide the control unit 26 with any information in respect of the extent to which the vehicle door 12 can be opened and whether it is necessary to lower the window pane 14 at all in order to make entry easier. Consequently, the control unit 26 activates the door parameter determining means 30 in order to acquire information about the extent to which the vehicle door 12 can be opened. This is done by the distance sensors 34 being activated and the control unit 26 evaluating the distance signals $S_{AB}$ from the distance sensors. If the vehicle door is opened, the control unit 26 activates the door opening speed sensors 36 and evaluates the door opening speed signals $S_{VT}$ in order to determine whether the door opening speed is below a specific threshold value.

If the vehicle door 12 has been moved to the opened position and is stationary in the opened position, the door opening angle sensors 38 are activated and the door opening angle signals $S_{WT}$ are evaluated in order to determine whether the measured door opening angle α is below a specific threshold value or the difference between the maximum door opening angle α max and the measured door opening angle α is above a specific threshold value.

FIG. 4a shows the case in which the vehicle door 12 bears against an object 46 by way of the door edge. Owing to the contact, the door edge protection device 43 generates corresponding edge protection signals $S_{TK}$ which are transmitted to the control unit 26 and taken into account when ascertaining the position to which the window pane 12 is intended to be lowered.

Depending on the design of the vehicle, it is also possible for only some of these signals to be evaluated since, in particular, the signals from the door opening angle sensor and from the distance sensor may be redundant. However, the redundancy also increases the reliability when determining the position at which entry and exit are made easier. Depending on the number and arrangement of the distance sensors 34, the situation can occur of it not being possible to completely cover these objects in the area surrounding the side of the vehicle. In this case, the signal from the door opening angle sensor takes precedence. As a result, it is also possible to take account of the case of the vehicle occupant 16, for whatever reason, not always having opened the vehicle door 12 to the extent possible.

The control unit 26 can then determine the extent to which the vehicle door 12 can be opened and the extent to which the vehicle door 12 is opened. As a result, the control unit is able to determine a position in which the vehicle door 12 makes it easier for the vehicle occupant 16 to enter. As a result of this, the control unit 26 drives the drive device 28 in such a way that the window pane 14 is lowered to the ascertained position. In this case, provision can be made for the door opening angle signal $S_{WT}$ to override the signals from the distance sensors 34 and from the door opening speed sensors 36 and for the position of the window pane 14 to be calculated only when the measured door opening angle α is below a specific threshold value or the difference between the maximum door opening angle α max and the measured door opening angle α is above a specific threshold value. Once the vehicle occupant 16 has entered and has closed the vehicle door 12, the window pane 14 is raised to the maximum extent again, according to one embodiment.

It is possible to depart from the above-described procedure in the following cases: if the window pane 14 has already been lowered to a position in which it makes entry easier, particularly when the window pane 14 has been completely lowered, the window pane 14 is not raised to the ascertained position. In this case, it should be taken into account that the control unit 26 calculates the position such that it lowers the window pane 14 to the extent necessary but as little as possible. If the window pane 14 is located below this position, it may not possible to make entry and exit any easier.

If the rain sensors 40 and the windshield wiper activity sensor 42 registers precipitation, the window pane 14 can either not be lowered at all or can be lowered only by a small amount, so that entry is made somewhat easier, but not yet to the full extent. To this end, the vehicle occupant 16 can selectively configure the control unit 26 such that the window pane 14 is lowered to the corresponding extent, or not, in the event of precipitation. In the process, the vehicle occupant 16 can also determine that, even if precipitation is falling, this is ignored and the window pane 14 is lowered to the ascertained position in which entry is made easier to the optimum extent.

A further option for deviating from the above-described procedure is provided by the following configuration of the activation device 44. The activation device 44 can be configured such that it always triggers the control unit 26 to lower the window pane 14 to a position in which entry and exit are made easier, specifically even in the case in which the algorithm which is stored in the control unit 26 comes to the conclusion that lowering is not necessary, in particular in the case in which the vehicle door 12 can be completely opened, as standard or in response to the push of a button or by means of some other activation.

A similar procedure is followed when exiting from the vehicle 10, wherein it is necessary to first wait until the vehicle is at a standstill and to register the operation or the imminent operation of the inner unlocking lever in order to execute the above-described steps.

Figure 5:
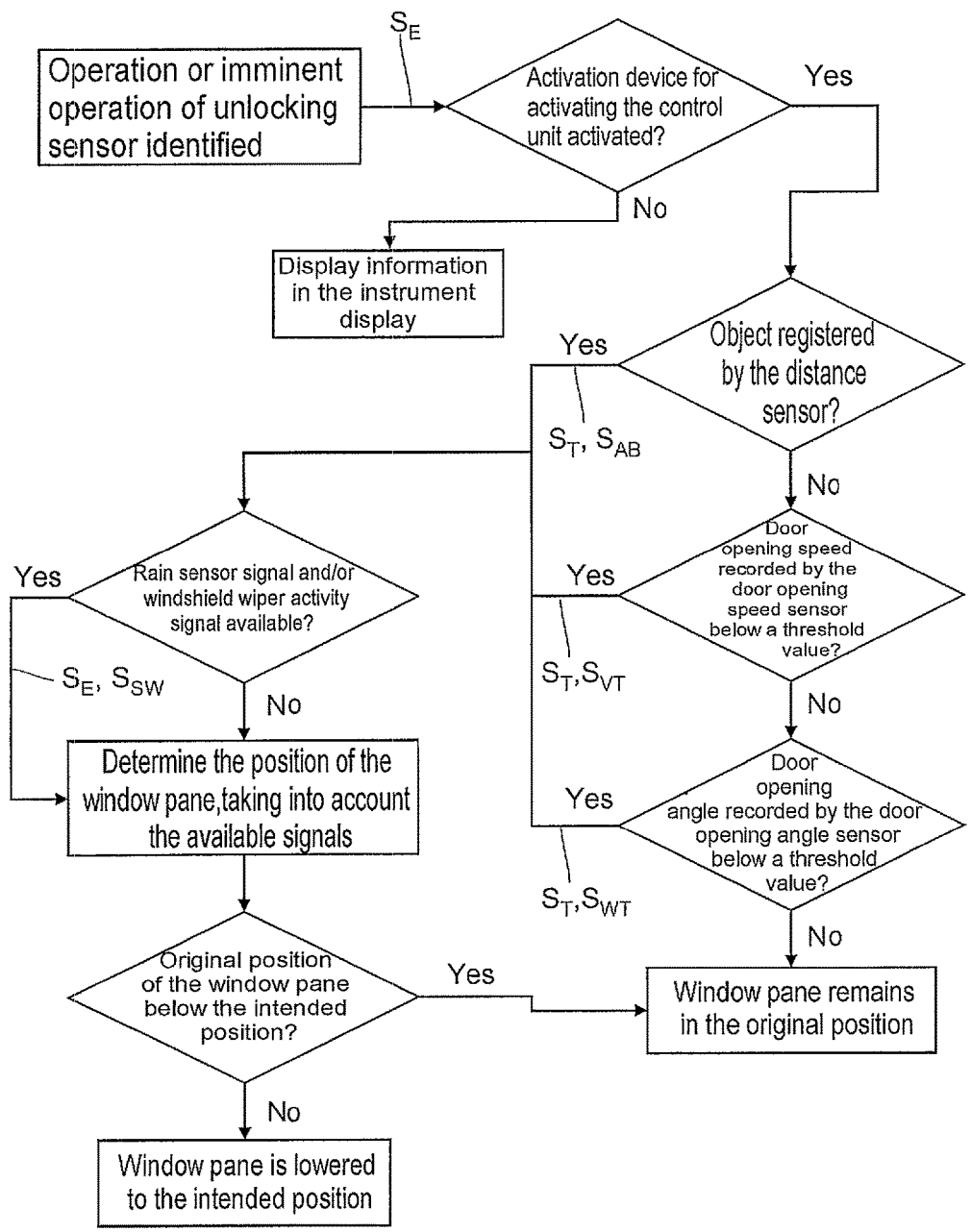
FIG. 5 is a flowchart illustrating a method of lowering a window pane, according to one embodiment.

FIG. 5 shows a flowchart of the method according to one embodiment. First, the unlocking sensor 24 registers whether the door unlocking apparatus 18 is operated or operation is expected, and generates an unlocking signal $S_E$.

If the activation device 44 is deactivated, corresponding information is displayed in the instrument display of the vehicle and no further action is triggered. If the activation device 44 is activated, the distance signals $S_{AB}$ which are generated by the distance sensors 34, the door opening speed signals $S_{VT}$ which are generated by the door opening speed sensors 36 and/or the door opening angle signals $S_{WT}$ which are ascertained by the door opening angle sensors 38 are evaluated. If an object is located in the area surrounding the side of the vehicle, the door opening speed is less than an intended angular speed (measured in degrees per second) and/or the measured door opening angle is below a specific limit value or the difference between the maximum door opening angle α max and the actual door opening angle α (measured in degrees) is above a specific limit value, the window pane 14 is, taking into account these signals, lowered to a position in which it is made easier for the vehicle occupant 16 to enter and exit the vehicle 10. Taking into account the door edge protection signal $S_{TK}$, which is generated by the door edge protection device 43, is not illustrated, wherein, however, the door edge protection signal $S_{TK}$ is taken into account in a similar manner to the other signals.

If none of the checks leads to a positive result, the window pane 14 remains in the original position. When calculating the position in which entry and exit are made easier, the activity of the windshield wipers 41 and the rain intensity are taken into consideration, provided that at least one of the rain intensity signals $S_R$ or of the windshield wiper activity signals $S_{SW}$ is available. If the position in which entry and exit are made easier is calculated, the position is compared with the current or original position of the window pane 14. If the window pane 14 is located below the calculated position, the window pane 14 is neither lowered nor raised but rather remains in the original position. Once the vehicle occupant has entered, the window pane 14 is raised to the maximum extent again.

One aspect of the disclosure relates to a method for lowering a window pane of a vehicle door of a vehicle in order to make it easier for the vehicle occupant to enter and exit the vehicle, wherein the vehicle door has a door unlocking apparatus and a drive device for lowering and raising the window pane, the vehicle comprises an unlocking sensor, which registers the operation or the imminent operation of the door unlocking apparatus and converts the operation or imminent operation into corresponding unlocking signals, and a control unit, which receives the unlocking signals and converts the signals into operating signals for triggering the drive device, and the method comprises the following steps: checking, with the control unit, whether the door unlocking apparatus is operated or operation is imminent; and if the door unlocking apparatus is operated or operation is imminent, triggering the drive device with the control unit in such a way that the window pane is lowered to a position in which it is made easier for the vehicle occupant to enter and exit the vehicle.

The door unlocking apparatus of a given vehicle door usually comprises an inner and an outer unlocking lever. The vehicle door is opened by pulling one of the unlocking levers. As an alternative or in addition to the unlocking lever, the door unlocking apparatus can also be operated by a specific gesture or by pushing a button, for example within the vehicle or on the vehicle key, or by touching an area which is intended for this purpose and the vehicle door being opened, possibly even without active involvement by the vehicle occupant, for example using an actuating motor. Particularly when the vehicle door is unlocked by touching an area which is intended for this purpose, the unlocking sensor can be designed such that it registers the approaching hand of the vehicle occupant as early as before the intended area has already been touched. In addition, some vehicles can identify that the vehicle key is in the area surrounding the vehicle. In this case, it can be expected that operation of the door unlocking apparatus is imminent. This circumstance is described by the imminent operation of the door unlocking apparatus.

If the door unlocking apparatus is operated or corresponding operation is immediately imminent, the window pane of the vehicle door is lowered to such an extent that it is made easier for the vehicle occupant to enter and exit. DE 196 32 139 C1 describes a drive device with which the window panes can be lowered and raised. In this case, lowering and raising relate to the intended orientation of the vehicle when it is situated at a substantially horizontal level. During lowering, the window pane is moved into the base of the vehicle door, and is moved out of the base during raising. In this case, the method according to the present disclosure is based on the knowledge that, in particular when the vehicle door can be opened only through a small door opening angle owing to objects in the area surrounding the side of the vehicle, the window pane constitutes an obstacle for the vehicle occupant. In many cases, the head, the shoulder and/or the upper arm of the vehicle occupant come/comes into undesired contact with the window pane when the occupant is entering or exiting the vehicle. According to the proposal, the window pane is lowered to such an extent that such contact is avoided. Consequently, a greater amount of space is available for the vehicle occupant to enter the vehicle or exit the vehicle. In particular, the occupant can move his upper body out above the open vehicle door, as a result of which entry or exit is made easier.

The measures required for implementing the disclosed idea presented here may be restricted, in addition to the provision of the corresponding sensors, to proposed programming of the control unit in which algorithms are stored, with which algorithms it is possible to ascertain the extent to which the window pane has to be lowered in order to make it easier for the vehicle occupant to enter and exit if the vehicle door can be opened only through a small door opening angle. In this case, the objective is to lower the window pane to the extent required but as little as possible. In particular, complete lowering is intended to be prevented as far as possible in order to avoid unnecessary movements of the window pane and therefore to keep the noise level, the energy consumption and the loading on the window pane itself and the seals and mechanical systems low. It has been found that lowering, starting from the maximum raised position and with respect to the height, through at least 30%, and through 30% to 50% in one embodiment already makes it considerably easier to enter and exit the vehicle. If the window pane is already in a position in which entry and exit are made easier, the drive device is not activated. In particular, the window pane is not raised when it is in a position which is below the position, which is ascertained by the control unit, for making it easier to enter and exit. Structural changes to the vehicle design, as are required when scissor or gull-wing doors are used instead of conventional vehicle doors which are fitted such that they can rotate about the vertical axis, are not required according to the present proposal.

It is known in the case of frameless vehicle doors to lower the window pane to such an extent that it can be moved out of the seals of the stationary part of the vehicle body. Window panes which are operated in this way are described in GB 2299870 A and in U.S. Pat. No. 8,827,027 B2. However, here, the window panes are lowered by only a few millimeters, this not making entry and exit easier. However, the hardware and software components which are used in frameless vehicle doors can be used, and therefore it is only necessary for the control unit to be appropriately reprogrammed, this being associated with a comparatively low level of expenditure.

According to a further embodiment, the vehicle has a door parameter determining device with which parameters relating to the vehicle door can be determined, wherein the door parameter determining device generates one or more door parameter signals, and the method exhibits the following step of determining the position of the window pane, in which position it is made easier for the vehicle occupant to enter and exit the vehicle, with the control unit, taking into account the door parameter signals.

Taking into account the door parameter signals makes it possible to lower the window pane only to the extent necessary in order to make it easier for the vehicle occupant to enter and exit. As a result, lowering of the window pane to an unnecessary extent and therefore the associated noise, the energy consumption, and loading of the seals, the mechanical systems and the window pane are reduced to the required amount.

In the case of one embodiment, the door parameter determining device can comprise one or more distance sensors for registering an object which is located in the area surrounding the vehicle, and the distance sensors can generate distance signals. In this case, the method can exhibit the following step of determining the position of the window pane, in which position it is made easier for the vehicle occupant to enter and exit the vehicle with the control unit, taking into account the distance signals.

Distance sensors and cameras are a common constituent part of modern vehicles and are used, for example, for parking and/or lane-changing assistants. The distance sensors and/or cameras can ascertain whether an object is located in the area surrounding the vehicle and, if yes, at what distance. As a result, it is possible to ascertain the extent to which or through which door opening angle the vehicle door can open. Taking into account the distance of the objects which are located in the area surrounding the vehicle, the position of the window pane, in which position entry and exit are made easier, can be determined in a relatively accurate manner. It may be appropriate here to lower the window pane further the closer objects are located to the vehicle. Lowering the window pane to an unnecessary extent, together with the above-described disadvantages, is also avoided in this way.

According to another embodiment, the door parameter determining device can comprise one or more door opening speed sensors for ascertaining the speed at which the vehicle door is opened, and the door opening speed sensors generate door opening speed signals, and the method exhibits the following step of determining the position of the window pane, in which position it is made easier for the vehicle occupant to enter and exit the vehicle with the control unit, taking into account the door opening speed signals.

The vehicle occupant will typically open the vehicle door more slowly when an object is located in the area immediately surrounding the vehicle and with which object the vehicle door may collide when opening, in order to avoid damage. When the door opening speed sensors register slow door opening, it can be concluded from this that there is an object in the area surrounding the side of the vehicle and the window pane can be moved in the direction of the position in which entry and exit are made easier even before the vehicle door has reached the opening position. Consequently, the speed at which the window pane is lowered can be kept low, as a result of which the loading on the seals and the energy consumption, and also the noise level, can be reduced. If the speed of lowering of the window pane is not reduced, the window pane assumes the position in which entry and exit are made easier earlier, so that it is not necessary for the vehicle occupant to first wait until the window pane has reached this position. Increased operator control convenience is provided in this case. The door opening speed sensors can further be used as redundancy for the unlocking sensors since they also indicate opening of the vehicle door. Consequently, the present method can also be executed should the unlocking sensors fail.

According to a further embodiment, the door parameter determining device comprises one or more door opening angle sensors for ascertaining the door opening angle at which the vehicle door is opened, wherein the door opening angle sensors generate door opening angle signals, and the method exhibits the following step of determining the position of the window pane, in which position it is made easier for the vehicle occupant to enter and exit the vehicle with the control unit, taking into account the door opening angle signals.

The door opening angle sensor measures the extent to which the vehicle door has been opened starting from the closed position. In the open position, the vehicle door is stationary. This door opening angle can be either processed directly by the control unit or the control unit compares the maximum possible door opening angle with the measured door opening angle and calculates a difference. The window pane is lowered only when the measured door opening angle lies below a threshold value or the difference lies above a threshold value. If these conditions are met, the position in which the window pane is lowered is determined. The position in which entry and exit are made easier can also be determined in a highly accurate manner in this way, as a result of which, in turn, unnecessarily lowering of the window pane is avoided.

In the case of a further embodiment, the vehicle can comprise one or more rain sensors for determining the intensity of the rain in the area surrounding the vehicle, and the rain sensors generate rain intensity signals, and the method exhibits the following step of determining the position of the window pane, in which position it is made easier for the vehicle occupant to enter and exit the vehicle, with the control unit, taking into account the rain intensity signals.

When the rain sensors register particularly severe precipitation, for example rain or snow, it is possible to dispense with lowering of the window pane or the window pane is lowered only to a reduced extent, so that entry and exit are made somewhat easier, but not to the best extent possible. This prevents snow or rain entering the interior of the vehicle, the interior being soiled and made wet as a result, due to the window pane being lowered. Analogously, the rain sensor can also be used when it is only able to detect the presence of precipitation, but not ascertain the intensity of the precipitation.

A further embodiment is distinguished in that the vehicle comprises one or more windshield wipers and a windshield wiper activity sensor for determining the activity of the windshield wipers, and the windshield wiper activity sensor generates windshield wiper activity signals, and the method exhibits the following step of determining the position of the window pane, in which position it is made easier for the vehicle occupant to enter and exit the vehicle, with the control unit, taking into account the windshield wiper activity signals.

When the windshield wiper activity sensor registers activity of the windshield wipers, this indicates precipitation. In this case, lowering of the window pane can be dispensed with or the window pane is lowered only to a reduced extent, so that entry and exit are made only somewhat, but nevertheless identifiably, easier, but without achieving the ideal case. This prevents snow or rain entering the interior of the vehicle, the interior being soiled and made wet as a result, due to the window pane being lowered.

In a further embodiment, the vehicle door comprises a door edge protection device, wherein the door edge protection device generates door edge protection signals, and the method exhibits the following step of determining the position of the window pane, in which position it is made easier for the vehicle occupant to enter and exit the vehicle, with the control unit, taking into account the door edge protection signals.

The door edge protection device comprises an elastic edge protection element which, in the closed state of the vehicle door, is arranged on the rear end wall of the vehicle door and therefore is not visible from the outside. If the vehicle door is opened, the edge protection element surrounds the furthest projecting region of the door edge and therefore protects the door edge against contact with objects in the area surrounding the side of the vehicle. If the vehicle door is closed again, the edge protection element is moved back to the rear end wall. The door edge protection device can be designed such that the contact with adjacent objects can be registered. By way of example, pinching of the edge protection element can be recorded and door edge protection signals can be generated as a result. These door edge protection signals provide information about the extent to which the vehicle door can be opened at a maximum and that the vehicle occupant is in the process of entering or exiting the vehicle. Using this information, the control unit calculates the position in which entry or exit is made easier and triggers lowering of the window pane to this position.

The disclosure further proposes a vehicle comprising a vehicle door, it being possible for the window pane of the vehicle door to be lowered using a method according to one of the preceding embodiments. The technical effects and advantages which can be achieved with the proposed vehicle correspond to those which have already been discussed for the present method.

In summary, it should be noted that it is also possible to make it easier for the occupant to enter and exit when the vehicle door cannot be completely opened due to objects being located in the area surrounding the vehicle. The present method can, in particular, also be used in vehicles which have a vehicle door which is fitted such that it can rotate about the vertical axis of the vehicle. The measures required for implementing the present method are restricted in many cases to reprogramming the control unit. In particular, no changes to the vehicle design are required, as would be the case, for example, if gull-wing or scissor doors were used.

According to a further embodiment, the vehicle has an activation device for activating the control unit. In this embodiment, the vehicle occupant is provided with the option of suppressing lowering of the window pane when entering and exiting if the vehicle door cannot be completely opened. Granting this option provides the vehicle occupant with control over the processes when entering and exiting, particularly when the vehicle occupant can or wishes to dispense with the advantages of the present method. The activation and/or the deactivation can be graphically displayed, for example by the activation device being lit in a specific manner such that the color can change in the event of activation and/or deactivation, or that a corresponding symbol is shown on or hidden from the instrument display. However, in this case, the activation device can also be configured such that, when the vehicle occupant operates the activation device, the window pane is lowered in any case, in particular when the vehicle door can be opened to such an extent that the control unit arrives at the conclusion that the window pane does not have to be lowered. This option increases the convenience for the vehicle occupant, for example if the vehicle occupant is affected by the window pane even when the vehicle door is opened to the maximum extent or the vehicle occupant does not wish to open the vehicle door to the maximum extent even though this would be possible.

It is appropriate that the vehicle door is frameless, according to one embodiment. In principle, the proposed method is not restricted to a specific design of vehicle doors. However, it is particularly appropriate for frameless vehicle doors since, when the window pane is lowered, no interfering frame which may make entry and exit more difficult, in spite of the vehicle door window pane being lowered, remains. As explained above, the window panes in frameless vehicle doors are in many cases lowered to such an extent that they no longer engage into the seals of the stationary part of the vehicle anyway. In this case, the additional expenditure for implementing the proposed idea is particularly low since it is only necessary to reprogram the control unit in an appropriate manner.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for lowering a window pane of a vehicle door of a vehicle to enable a vehicle occupant to enter and exit the vehicle, comprising the steps of:
    providing the vehicle door with a door unlocking apparatus and a drive device for lowering and raising the window pane;
    registering operation or imminent operation of the door unlocking apparatus with an unlocking sensor and converting the operation or imminent operation into one or more corresponding unlocking signals;
    converting the unlocking signals into operating signals for triggering the drive device;
    checking with a control unit, whether the door unlocking apparatus is operated or operation is imminent; and
    when the door unlocking apparatus is operated or operation is imminent, triggering the drive device via the control unit in such a way that the window pane is lowered to a position that enables a vehicle occupant to enter and exit the vehicle.

2. The method as claimed in claim 1, wherein the vehicle comprises a door parameter determining device with which one or more parameters relating to the vehicle door are determined and the door parameter determining device generates corresponding door parameter signals, and the method determines the position of the window pane that enables the vehicle occupant to enter and exit the vehicle with the control unit, taking into account the door parameter signals.

3. The method as claimed in claim 2, wherein the door parameter determining device comprise one or more distance sensors for registering an object which is located in an area surrounding the vehicle and the distance sensors generate distance signals, and the method determines the position of the window pane that enables the vehicle occupant to enter and exit the vehicle, with the control unit, taking into account the distance signals.

4. The method as claimed in claim 2, wherein the door parameter determining device comprises one or more door opening speed sensors for ascertaining speed at which the vehicle door is opened, and the door opening speed sensors generate door opening speed signals, and the method determines the position of the window pane that enables the vehicle occupant to enter and exit the vehicle, with the control unit, taking into account the door opening speed signals.

5. The method as claimed in one of claim 2, wherein the door parameter determining device comprises one or more door opening angle sensors for ascertaining the door opening angle at which the vehicle door is opened, and the door opening angle sensors generate door opening angle signals, and the method determines the position of the window pane that enables the vehicle occupant to enter and exit the vehicle, with the control unit, taking into account the door opening angle signals.

6. The method as claimed in claim 1, wherein the vehicle comprises one or more rain sensors for determining intensity of the rain in the area surrounding the vehicle, and the rain sensors generate rain intensity signals, and the method determines the position of the window pane that enables the vehicle occupant to enter and exit the vehicle, with the control unit, taking into account the rain intensity signals.

7. The method as claimed in claim 1, wherein the vehicle comprises one or more windshield wipers and a windshield wiper activity sensor for determining the activity of the windshield wipers, and the windshield wiper activity sensor generates windshield wiper activity signals, and the method determines the position of the window pane that enables the vehicle occupant to enter and exit the vehicle, with the control unit, taking into account the windshield wiper activity signal.

8. The method as claimed in claim 1, wherein the vehicle door comprises a door edge protection device, and the door edge protection device generates door edge protection signals, and the method determines the position of the window pane that enables the vehicle occupant to enter and exit the vehicle, with the control unit, taking into account the door edge protection signals.

9. The method as claimed in claim 1, wherein the vehicle door is a frameless vehicle door of which the window pane is controllable to be electrically lowered.

10. The method as claimed in claim 1, wherein the vehicle has an activation device for activating the control unit.

11. A vehicle comprising:
   a door comprising a window pane, a door unlocking apparatus and a drive device for lowering and raising the window pane;
   an unlocking sensor detecting operation or impending operation of the door unlocking apparatus, wherein the operation or impending operation is converted into one or more corresponding unlocking signals that are converted into operating signals for triggering the drive device; and
   a control unit checking whether the door unlocking apparatus is operated or operation is impending, and triggering the drive device when operation or imminent operation of the door unlocking apparatus is detected to lower the window pane to a position that enables a vehicle occupant to enter and exit the vehicle.

12. The vehicle as claimed in claim 11 further comprising a door parameter determining sensor generating one or more door parameter signals, wherein the control unit takes into account the door parameter signals when activating the driver device.

13. The vehicle as claimed in claim 12, wherein the door parameter determining sensor comprises one or more of a distance sensor for sensing distance between the vehicle and an object located in the area surrounding the vehicle, a door opening speed sensor for ascertaining speed at which the vehicle door is opened, a door opening angle sensor for ascertaining a door opening angle, a rain sensor for determining intensity of rain in an area surrounding the vehicle, and a windshield wiper activity sensor for determining activity of one or more windshield wipers.

14. The vehicle as claimed in claim 11, wherein the vehicle door is a frameless vehicle door of which the window pane is controllable to be electrically lowered.

* * * * *